3,370,342
FLUXLESS SOLDERING PROCESS FOR RARE EARTH CHALCOGENIDES

Bernell E. Argyle, Yorktown Heights, and Reid W. Kaplan, Putnam Valley, N.Y., assignors to International Business Machines Corporation, Armonk, N.Y., a corporation of New York No Drawing. Filed May 7, 1965, Ser. No. 454,162
3 Claims. (Cl. 29—472.7)

ABSTRACT OF THE DISCLOSURE

An eutectic alloy consisting of 60% by weight of bismuth and 40% by weight of cadmium is a very effective solder for the rare earth chalcogenides and, in particular, for the europium chalcogenides.

This invention relates to solders and more particularly to a process for soldering chalcogenides.

The rare earth materials are becoming increasingly important in the field of semiconductors, thermoelectric devices and the like because they have high magnetic moments, high Faraday effects and, under certain conditions, are superconductive with relatively high transition temperatures. Chalcogenides are compounds containing at least one member of the group consisting of oxygen, sulfur, selenium and telurium. The latter four elements comprise the group identified as VI–A in the Periodic Chart. Representative chalcogenides would be bismuth telluride, antimony telluride, silver indium telluride, copper gallium telluride, etc. A more detailed listing of chalcogenides and the electrical devices in which they are used is set forth in U.S. Patent No. 3,031,516 which issued Apr. 24, 1962.

A variety of solders, such as the Pb-Sn solders, as well as indium compounds, bismuth compounds and amalgams have been tried as solders for the rare earth chalcogenides but they have been found inadequate either because they did not wet the chalcogenides or they had very poor electrical and mechanical contacts. A solid solution of bismuth and cadmium has been discovered which, when combined to form an eutectic alloy, has resulted in a solder which has a low melting point, is mechanically strong, makes very good electrical contact and does not shrink on soldifying. The eutectic alloy is employed to solder chalcogenides to other chalcogenides, to other metals, or to any otherwise solderable materials.

An object of the invention is to provide a fluxless solder particularly useful for making good connections to rare earth chalcogenides.

Another object is to provide a fluxless solder for chalcogenides which make good ohmic contact with the latter.

Yet another object is to provide a soldering process for attaining the above two objects that results in a mechanically strong connection that is obtainable at a relatively low temperature.

The foregoing and other objects, features and advantages of the invention will be apparent from the following more particular description of a preferred embodiment of the invention.

The solder is obtained by mixing weighted amounts of bismuth and cadmium in a suitable container, such as graphite, and heating to a temperature of approximately 321° C. or higher, the latter being the melting point of cadmium, the latter having a higher melting point than bismuth. To obtain an eutectic alloy having all the characteristics noted above, 60% by weight of bismuth is mixed with 40% by weight of cadmium. The bismuth and cadmium may be in powdered or granular form or may be prepared in any manner that would provide for its insertion into the graphite crucible prior to heating the latter to fuse the two materials. The eutectic composition has a sharp and distinct melting point at 144° C. By varying the composition slightly, the latter melting point might become 147° C. Deviations in the weighted amount could be as much as 5% for either material although the 60–40 ratio is preferred. Employment of the solder for joining rare earth chalcogenides has proven the fluxless solder to be particularly effective. The overall effectiveness is good whereas particular chalcogenides produce extremely good bonds with the solder; for example, the europium chalcogenides have shown exceptionally good contact with the solder described herein. The user of the new alloy described herein will obtain results that may vary slightly with each chalcogenide chosen, but the overall effect of the solder will be that of one which wets the chalcogenides and provides good electrical and mechanical contact at fairly low temperatures without the need for flux. Actual soldering takes place in the following manner: The surface to be soldered is rubbed on an emery surface so as to obtain a clean surface. It is understood that, in some cases, solvents that do not react with the chalcogenides may also be used to clean surfaces prior to soldering. The chalcogenides are held in position by a jig or other support and soldering proceeds in the conventional manner, namely, the 60 Bi–40 Cd alloy is heated to the temperature of the eutectic composition and heat is withdrawn after the soldering is completed.

While the invention has been particularly described with reference to a preferred embodiment thereof, it will be understood by those skilled in the art that the foregoing and other changes in form and details may be made therein without departing from the spirit and scope of the invention.

What is claimed is:

1. The process of soldering a rare earth chalcogenide to another member comprising the steps of (1) applying an eutectic alloy consisting of 60% by weight of bismuth and 40% by weight of cadmium to the interfacial area of such chalcogenide and said member, (2) heating said eutectic alloy to its melting point, and (3) discontinuing said heating step after melting has taken place.

2. The process of claim 1 wherein the 60–40 ratio of bismuth to cadmium may vary by ±5%.

3. The process of soldering an europium chalcogenide to another member comprising the steps of
   (1) applying a eutectic alloy consisting of 60% by weight of bismuth and 40% by weight of cadmium to the interfacial area of such europium chalcogenide and said member,
   (2) heating said alloy to its melting point, and
   (3) discontinuing said heating step after melting has taken place.

References Cited

UNITED STATES PATENTS

| | | | |
|---|---|---|---|
| 3,017,693 | 1/1962 | Haba | 136—237 X |
| 3,031,516 | 4/1962 | Pessel | 136—238 X |
| 3,110,100 | 11/1963 | Hill | 29—493 X |
| 3,226,804 | 1/1966 | Hasenclever | 29—155.5 |
| 3,248,777 | 5/1966 | Stoll | 29—155.5 |

FOREIGN PATENTS 954,297 4/1964 Great Britain.

OTHER REFERENCES

Brazing and Soldering Alloys, Semi-Conductor Data, Mar. 27, 1962.

JOHN F. CAMPBELL, *Primary Examiner.*

R. F. DROPKIN, *Assistant Examiner.*